United States Patent [19]
Grady

[11] Patent Number: 5,836,298
[45] Date of Patent: *Nov. 17, 1998

[54] PORTABLE OUTDOOR FIREPLACE AND FIRE SCREEN ASSEMBLY THEREOF

[75] Inventor: Jeff Grady, Naperville, Ill.

[73] Assignee: Fleming Sales Company, Lombard, Ill.

[*] Notice: The term of this patent shall not extend beyond the expiration date of Pat. No. 5,598,834.

[21] Appl. No.: 728,545

[22] Filed: Oct. 9, 1996

Related U.S. Application Data

[63] Continuation-in-part of Ser. No. 564,379, Nov. 24, 1995, Pat. No. 5,598,834.

[51] Int. Cl.$^6$ .................................................. F24B 1/182
[52] U.S. Cl. ........................ 126/506; 126/519; 126/276
[58] Field of Search .................................. 126/512, 519, 126/547–550, 29, 30, 276, 200, 224, 213, 222, 25 R, 506; 110/240–242

[56] References Cited

U.S. PATENT DOCUMENTS

| D. 192,491 | 3/1962 | Crownover . | |
|---|---|---|---|
| D. 200,137 | 1/1965 | Hanna . | |
| D. 284,929 | 8/1986 | Schlosser et al. . | |
| D. 375,347 | 11/1996 | Whalen et al. . | |
| 3,455,291 | 7/1969 | Glass | 126/519 |
| 3,499,432 | 3/1970 | Hannebaum | 126/519 |
| 3,981,292 | 9/1976 | Lilly et al. . | |
| 4,216,760 | 8/1980 | Wiggins . | |
| 4,273,096 | 6/1981 | Hannebaum . | |
| 4,332,235 | 6/1982 | Hannebaum . | |
| 4,498,452 | 2/1985 | Schlosser et al. . | |
| 5,596,980 | 1/1997 | Whalen et al. | 126/519 |
| 5,598,834 | 2/1997 | Grady | 126/519 |

FOREIGN PATENT DOCUMENTS 2916090 10/1979 Germany .
397287 8/1933 United Kingdom .

OTHER PUBLICATIONS

Whalen Manufacturing, Whalen Firepit Brochure, 1 page (Jan. 1994).
Weber Barbecue Catalog, pp. 14–15—Barbecue grills & Smokers (1984).
Backyard Max Installation Instructions, GSW, Mar. 1994.
Coleman Outdoor Fireplace Assembly & Instruction Manual Coleman Manufacturing, Sep. 1996.

Primary Examiner—James C. Yeung
Attorney, Agent, or Firm—Lockwood, Alex, FitzGibbon & Cummings

[57] ABSTRACT

A portable outdoor fireplace with a fire screen assembly convertible into a cooking grill includes top and bottom cover members and a fire screen assembly extending vertically therebetween. The fire screen assembly is cylindrical and includes multiple screen panels supported vertically therein. At least one screen panel may be hinged to provide a side entrance to the fireplace. The fire screen assembly includes a plurality of supports that support a cooking grill near the entrance of the fireplace at different locations.

21 Claims, 6 Drawing Sheets

PORTABLE OUTDOOR FIREPLACE AND FIRE SCREEN ASSEMBLY THEREOF

REFERENCE TO RELATED APPLICATION

This is a continuation-in-part application of prior U.S. patent application Ser. No. 08/564,379 filed Nov. 24, 1995, now U.S. Pat. No. 5,598,834.

BACKGROUND AND SUMMARY OF THE INVENTION

The present invention generally relates to portable fireplaces, and more particularly, to a portable outdoor fireplace with a fire screen assembly that permits easy access to the fire bowl of the fireplace and also supports a cooling grill.

Fixed outdoor fireplaces, such as those made from brick, masonry and the like have been known for years. Portable outdoor fireplaces have recently entered the marketplace. Their size is small and their structure is such that it permits them to be easily moved from one location to the other. Such fireplaces are found in the patent literature in Design U.S. Pat. No. 293,191, issued Dec. 15, 1987 and U.S. Pat. No. 5,094,223 issued Mar. 10, 1992.

The 293,191 design patent is assigned to Weber-Stephen Products and describes a portable outdoor fireplace which incorporates the top and bottom covers of the well-known Weber "kettle" grill. The two covers are spaced apart by an internal framework which defines a fire pit area. No grill structure is shown in this patent which would permit cooking.

U.S. Pat. No. 5,094,223, on the other hand, describes a portable fire pit having a conical shield which supports a grill thereon so that the fireplace may be utilized for cooking in association with a propane or natural gas burner system. However, the structure of this fireplace is complex and has many parts.

One commercially available outdoor fireplace is sold under the name "Firepit" by Whalen Manufacturing of Macomb, Illinois. It is identical to the aforementioned '191 design patent but includes a functional fire screen assembly in which a plurality of screen are fixed to a cylindrical frame. No access can be had to the fire other than by lifting the top cover of this fireplace. The cover will get hot during use and this exposes a user to the prospect of inadvertent burns.

The prior art is lacking in disclosing or suggesting a hinged screen assembly which defines an entrance to the fireplace for inserting more combustible material therein as well as defines a support area for a cooling grill.

The present invention is directed to a portable outdoor fireplace having a convertible grill feature in which a portion of the fire chamber may be utilized as a grill as well as to a portable outdoor fireplace having a fire screen assembly forming an entrance to the fireplace, the entrance having means for receiving and supporting a cooking grill and the fireplace having an access door openable and closeable from the side of the fireplace.

It is therefore an object of the present invention to provide an outdoor fireplace with a convertible grill structure.

It is yet another object of the present invention to provide a portable outdoor fireplace with a convertible grill feature wherein the fireplace includes opposing base and cover portions and a framework assembly separating the base and cover portions and extending upwardly from the base cover to support the cover portion, the framework assembly supporting a plurality of fire screen panels to define an enclosed fire pit area therewithin, the framework assembly having at least two slotted members which permit one of the fire screen to be removed and inserted horizontally within the framework assembly in order to define a grilling surface of the fireplace.

A still further object of the present invention is to provide a portable outdoor fireplace having a fire bowl enclosed by a circular fire screen assembly, the fire screen assembly including a plurality of screens fixed to an upright support structure, one of the screens being hingedly mounted on the support structure and defining an entrance to the fireplace.

Yet another object of the present invention is to provide a cooling grill assembly which is at least partially insertable into the aforementioned fireplace entrance and is supported therein by grill support means.

The present invention accomplishes these objects in accordance with one principal aspect by utilizing a pair of opposing concave members which serve as respective cover and base portions of the fireplace. A fire screen assembly is held between the cover and base portions and stands vertically therein. The fire screen assembly includes a pair of horizontal support rings and vertical columns which cooperate to define a cylindrical frame in which multiple screen panels are supported. The screen panels provide a barrier for the fire screen assembly which retains burning embers and other fire material within the fire pit area defined in the bottom fire bowl. One of the fire screen panels is removable from its screen position in the cylindrical frame and is slidable horizontally into the cylindrical frame to thereby form a horizontal grill surface which functions as a cooking grill.

In another principal aspect of the present invention, the fire screen panel which serves as the cooking grill is a substantially flat panel which is vertically supported in the frame in a manner to retain the flatness of the cooking grill so that the utilization of the grill-screen panel as a grill is not compromised.

In yet another principal aspect of the present invention and as exemplified in a second embodiment of the invention, the grill-screen panel is formed from a highly resilient metal and formed in a pattern which permits the grill-screen panel to flex sufficiently for retention by the framework as a fire screen panel yet "rebound" back into a substantially flat shape when removed from the fire screen framework to effectively serve as a cooking grill when inserted horizontally into the framework assembly.

In still yet another principal of the present invention, the fire screen panels are fixed to the cylindrical frame and the frame includes an entrance to the fire bowl. This entrance is defined in part by one or more screened doors which are hingedly mounted to the frame. A separate cooking grill is insertable into the fireplace and held in a preselected horizontal orientation by a series of grill supports. The grill supports extend from the frame and from the screen door so that the cooking grill may be supported at different locations by the fireplace.

These and other objects, features and advantages of the present invention will be clearly understood through a consideration of the following detailed description.

BRIEF DESCRIPTION OF THE DRAWINGS

In the course of this detailed description, the reference will be frequently made to the attached drawings in which.

DETAILED DESCRIPTION OF THE PREFERRED EMBODIMENTS

Figure 1:
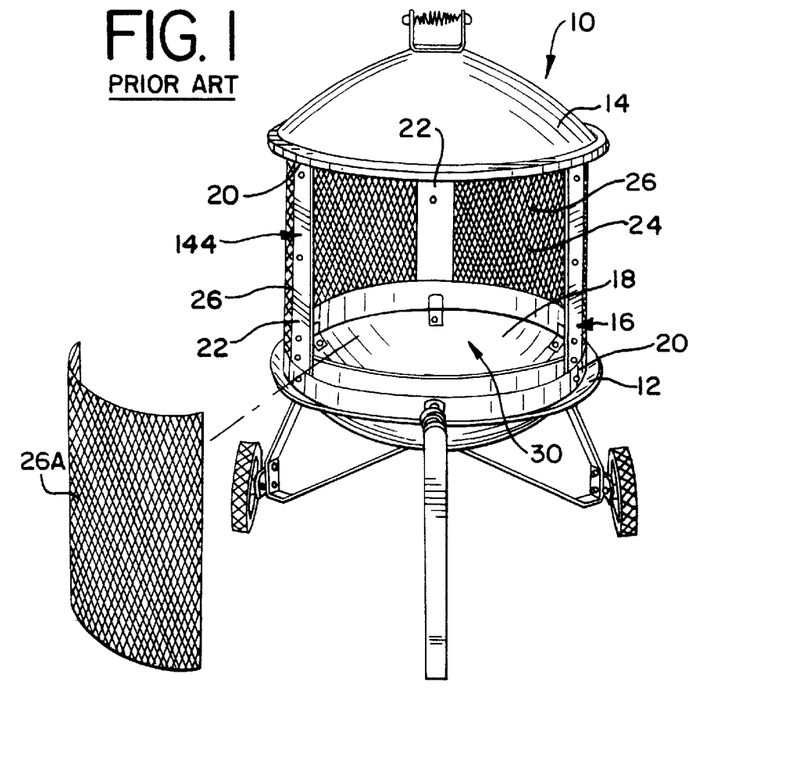
FIG. 1 is a perspective view of a known portable outdoor fireplace.

FIG. 1 illustrates a portable outdoor fireplace 10 of a known type such as the aforementioned "Firepit" that is representative of certain prior art constructions. The fireplace 10 has a bottom bowl member 12 and a top cover member 14 which are separated by a vertical screen structure 16 which constitutes a fire chamber 18 of the fireplace 10. The screen structure 16 includes top and bottom support rings 20 interconnected by risers 22 which define a series of arcuate openings 24 between the support rings 20 and risers 22. These openings 24 are, in effect, slots that receive and support a series of curved screen panels 26 vertically therein in a manner to form an enclosed fire chamber which stands in the bottom bowl member 12 into which fire material is placed and burned. One of the curved screen panels 26A is removable while the remaining panels 26 are fixed to the structure, the removable curved screen panel defining an opening 30 in the fireplace 10 through which a user may add additional fuel to the fire pit or stir the material therein. This known construction is complex to assemble because it requires both inner and outer support rings to form the arcuate slot and openings 24.

Figure 2:
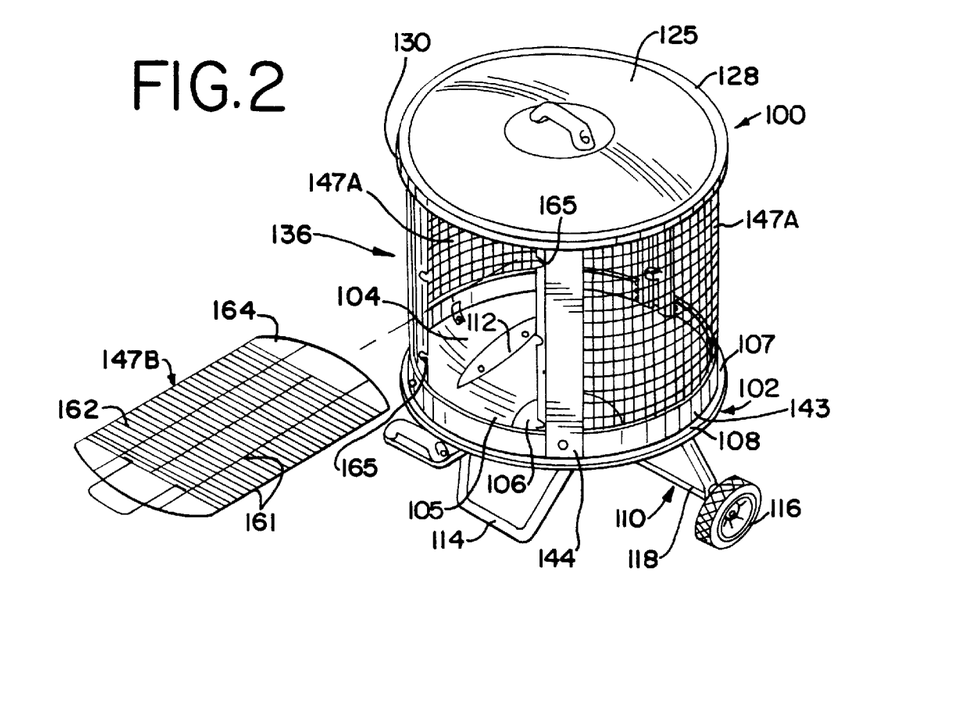
FIG. 2 is a perspective view, partially exploded of a portable outdoor fireplace constructed in accordance with the principles of the present invention illustrating the fire screen-grill in position for insertion into the fireplace.

A portable, convertible outdoor fireplace constructed in accordance with the principles of the present invention is illustrated generally at 100 in FIG. 2. The convertible fireplace 100 includes a lower base member 102 which is preferably conical in shape in order to define a concave receptacle which serves as a fire bowl 104. The bottom 105 of the fire bowl 104 preferably includes a central flat portion 106 which defines a surface suitable for supporting an appropriate fuel in the fire pit, such as logs, charcoal, coal or the like.

A carriage assembly 110 is disposed beneath the fire bowl 104 to support it off of the ground as illustrated, and is attached thereto by suitable means, such as bolts or screws which extend through openings 112 in the receptacle. The carriage assembly 110 includes a tubular chassis 114 having a generally inverted U-shaped configuration which supports a pair of wheels 116 interconnected by an axle 118. This carriage assembly 110 renders the convertible fireplace 100 portable so that it may be easily transported by a user. To facilitate such transport, the fire bowl 104 may include a handle support 120 extending outwardly therefrom, and which provides a base for the attachment of an insulated handle 122.

A top cover 125 is provided for the convertible fireplace 100 and also includes a concave bowl portion 126. The top cover 125 preferably has the same approximate diameter of the base member 102. The cover member 125 may include an outer rim 128 which has a channel 130 formed herein. The channel 130 may engage the outer rim 107 of the fire bowl 104 and also the fire chamber frame assembly 140. The diameters of the cover and base members is such that the engagement which occurs between the cover and base members 125, 102 is preferably tight enough so that the cover member 125 may be used to close off the fire pit area when the fire chamber frame assembly 140 is removed to cut off the flow of air to still-burning embers in the fire pit area.

As depicted in the drawings, the cover and base members 125, 102 are separated from each other by a fire chamber in the form of a frame assembly 140 which extends vertically therebetween. The fire bowl 104 may include an interior channel 108 spaced within its outer rim 107 which provides a support surface for the bottom of the frame assembly 140. The fire chamber frame assembly 140 encloses the fire pit area of the fire bowl 104 and surrounds the fuel which is burned therein. The frame assembly 140 includes a series of frame members 142–145 which are joined together to form a generally cylindrical frame 146 which in turn supports a series of fire screen panels 147A, 147B to form the enclosure.

Figures 3, 4, 6A, 7A:
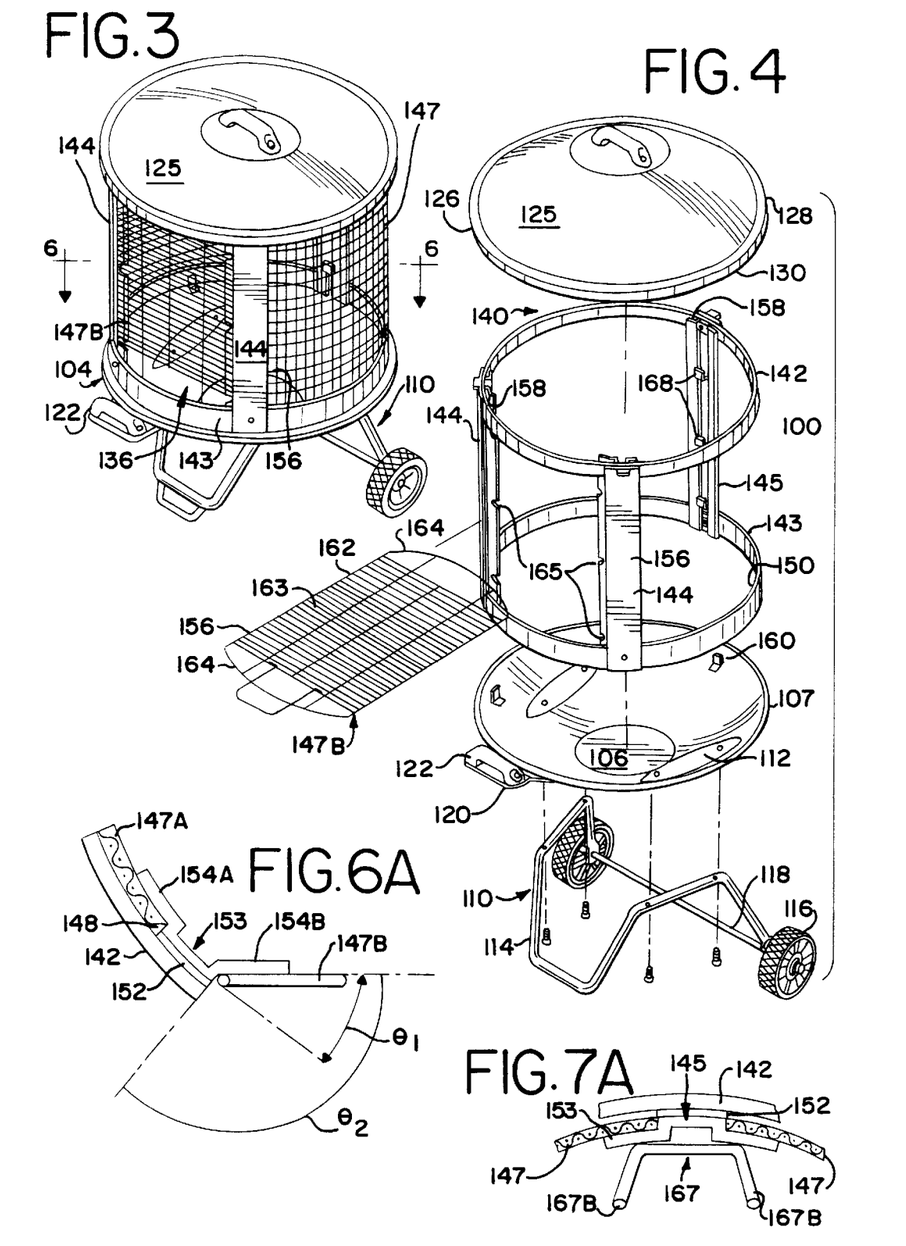
FIG. 3 is a perspective view of the fireplace of FIG. 2, with the fire screen-grill in place as a fire screen.
FIG. 4 is an exploded view of the fireplace of FIG. 2.
FIG. 6A is an enlarged view of a portion of FIG. 6 illustrating the structure of the forward frame column and flanges thereof in detail.
FIG. 7A is an enlarged view of a portion of FIG. 7 illustrating the structure of the rear frame column and flanges thereof in detail.
Figure 5:
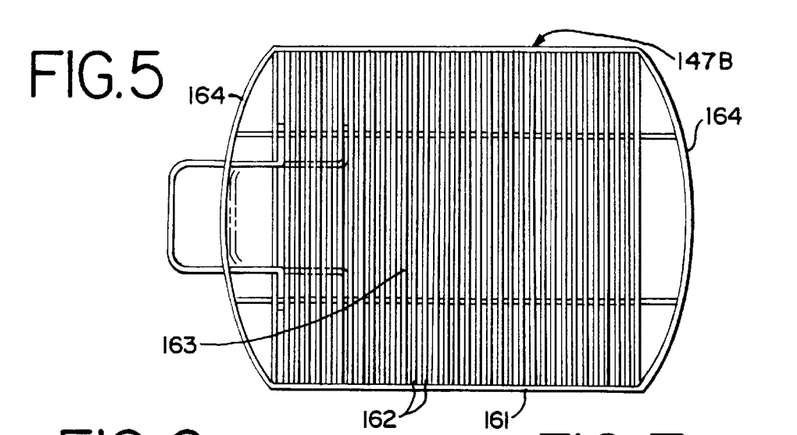
FIG. 5 is a plan view of a fire screen/grill member suitable for use in the fireplace of FIG. 2.

The frame members include upper and lower circular ring members 142, 143 and column members 144, 145, which interconnect the ring members 142, 143 together to form the cylindrical frame 146. This frame 146 is best illustrated in FIG. 4. The frame ring members 142, 143 may each include two circular beams which are spaced closely together in order to define a circular channel 150 within each of the top and bottom frame rings 142, 143 for retaining the screen panels 147 therein. The frame rings 142, 143 establish a perimeter of the frame assembly 140 and the fire chamber enclosed thereby and further present a circular profile when viewed from an end as in FIG. 6. These channels 150 will receive the respective bottom and top edges of the screen panels 147.

The frame columns 144, 145 are preferably of a multiple piece construction having interior and exterior components which may be bolted, welded, or otherwise fastened together. In the embodiment illustrated in FIGS. 2–6 and as specifically shown in FIG. 6A, the front frame columns 144 include an exterior support plate 156 and an interior flange plate 153. The interior flange plate 152 is stamped and formed in a manner which defines interior flanges 154A, 154B located inwardly of the support plates 152 and spaced apart therefrom in order to define vertical channels, or slots 156, in the columns 144. These vertical slots 156 formed in the frame columns 144 receive the ends 148 of the screen panels 147A.

In one aspect of the present invention, two of the screen panels 147A include curved metal screen sections which approximately match the diameters of the ring members 142, 143 and the fire bowl channel 107. The two screen panels 147A are thus easily received within the frame assembly 140 and match the cylindrical profile of the frame assembly 140. When inserted in place within the frame assembly 140, the two screen panels 147A provide a fire screen which encloses all but a small opening 136 of the fire pit area within the fire bowl 104.

This opening 136 retains a grill-screen panel 147B and provides a point of access to the fire pit area of the fire bowl 104 as well as insertion of the grill-screen panel 147B into the frame assembly 140 as explained more fully below. When all the screen panels 147A, 147B are inserted into the frame assembly 140, they will function to contain hot embers and debris within the fire pit area and to prevent users from contact with the fire due to inadvertence. The frame assembly 140 may be rigidly attached to the base receptacle 104 by way of a series of clips 160 which are affixed to the receptacle 104 and which may engage the frame assembly 140 by way of a suitable means, such as screws (not shown).

In an important aspect of the present invention, the frame assembly 140 is easily converted to a cooking grill 10 by removing the forward fire screen panel 147B from its vertical position within the frame assembly 140 and inserting it into the frame assembly 140 horizontally in order to form a horizontal cooking surface which may effectively function as a grill.

As mentioned above, the forward columns 144 include two sets of flanges 154A, 154B formed in their associated interior flange plates 153. The first set of flanges 154A extend generally parallel to their opposing column support plates 152 to define generally rectangular channels or slots 158 while the second set of flanges 154B do not extend parallel to the support plates 152. Rather, the second flanges 154B extend at an angle 61 therefrom, preferably at about approximately 450 from the plane defined by the support plate 152, or at an angle 62, about approximately 1350 from the edge of the support plate. (FIG. 6A.)

The two forward frame columns 144 are preferably aligned in their positions within the frame assembly 140 such that the second flanges 154B thereof are aligned with each other along an imaginary line C drawn between the two flanges 154B. The line C defines a chord of the perimeter defined by the top and bottom ring members 142, 143. The angular orientation of these flanges 154B importantly permits a substantially flat, and rigid, grill-screen panel 147B to be used to close off the opening 136 of the frame assembly 140 and as a cooking grill without compromising the desirable, flat characteristic of the grill-screen panel 147B.

Figure 6:
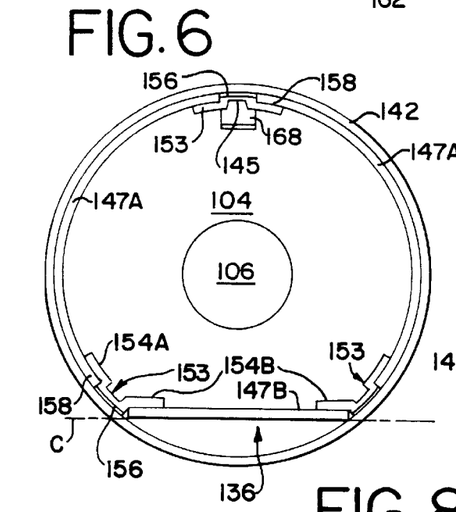
FIG. 6 is a sectional view of the fire screen assembly of the fireplace of FIG. 3 taken along lines 6—6 thereof.
Figure 7:
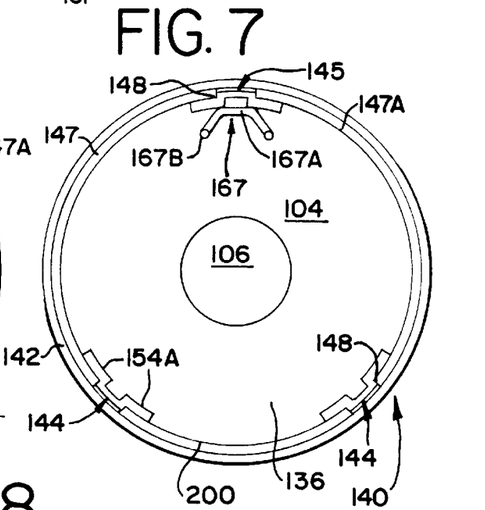
FIG. 7 is a sectional view of a second embodiment of a fire screen assembly suitable for use in fireplaces of the present invention.

FIGS. 3 and 6 illustrate a rigid grill-screen panel 147B suitable for use with the fireplace embodiment 100 of FIGS. 1–6. The grill-screen panel 147B has a series of metal grill bars 161, 162 which are welded together to form a rectangular pattern on the grill-screen panel 147B. These bars 161, 162 intersect together in a spacing sufficient to provide a usable grill area 163 to the grill-screen panel 147B in order to support various foods thereupon and serve as a fire screen. The grill-screen panel 147B preferably also includes a handle member 169 which is selectively engageable therewith in at least two different locations on the grill-screen panel 147B to provide a means for inserting and removing the grill-screen panel 147B into the frame assembly 140.

The opposing ends 164 of the grill-screen panel 147B may be curved in an arc which is preferably generally no greater than either the curvature of the perimeter of the fire chamber or of the arcs defined by the top and bottom cover members 125, 102 along vertical sections taken therethrough along the chord C of the frame assembly column second flanges 154B. This curvature relationship permits the end 164 of the grill-screen panel 147B to engage the frame column 145 without interference with the interior of the frame assembly 140 of the screens panels 147 thereof.

In another important aspect of the present invention, the frame columns include means for supporting the grill-screen panel 147B horizontally within the frame assembly 140 in a variety of elevations over the fire pit area. The forward frame column flange plates 153 include a series of supports in the form of generally horizontal slots 165 disposed in the second flanges 154B which permit insertion and removal of the grill-screen panel 147B. The rearward frame assembly column 145 cooperates with the forward column slots in supporting the grill-screen panel by means of a series of support bars 167 (FIG. 7A) or support clips 168 (FIGS. 6 & 6A) affixed thereto at elevations equal to those of the flange slots 165 in order to support the grill-screen panel 147B in a level, horizontal orientation in the frame assembly 140. As seen best in FIG. 7A, the support bars 167 are generally U-shaped and include a base portion 167A and two extending arm portions 167B.

Figure 8:
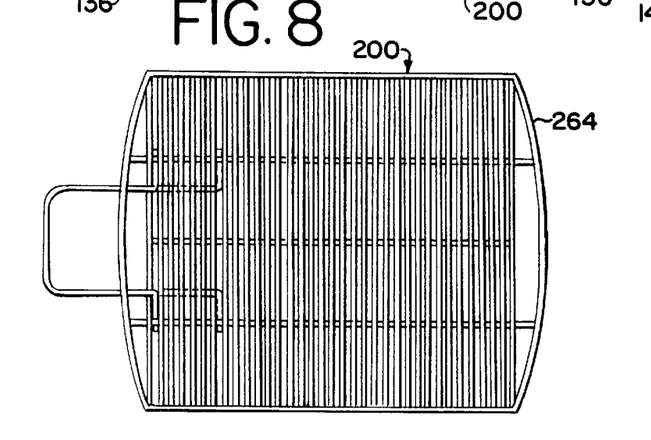
FIG. 8 is a plan view of a fire screen/grill member used in the fire screen assembly of FIG. 7.

Turning now to FIGS. 7A & 8, a second embodiment of a grill-screen panel 200 suitable for use with the present invention is illustrated. This grill-screen panel 200 is formed from a flexible material, such as an aluminum screen stock. This grill-screen panel 200 is flexible, rather than rigid as in the first embodiment, so that it may adopt a curved profile when inserted into the frame assembly 140 in a vertical orientation. In this regard, the forward frame members 144 do not have a second set of flanges 154B as in the first embodiment, but rather include two sets of flanges 154A aligned with the perimeter of the frame assembly 140. The flexibility of the material used for this grill-screen panel 200 permits it to flex back to its substantially flat profile after it is removed from engagement with the flanges 154A. The end 264 of the grill-screen panel 200 is also preferably curved, with a curvature no greater than that of the perimeter of the frame assembly, so that the end 264 may engage the rear frame column 145 without interference from any part of the frame assembly 140. The forward frame columns 144 will contain similar slots to which accommodate the grill-screen panel 200 in a horizontal orientation in the frame assembly 140 over the fire pit area.

Figure 9:
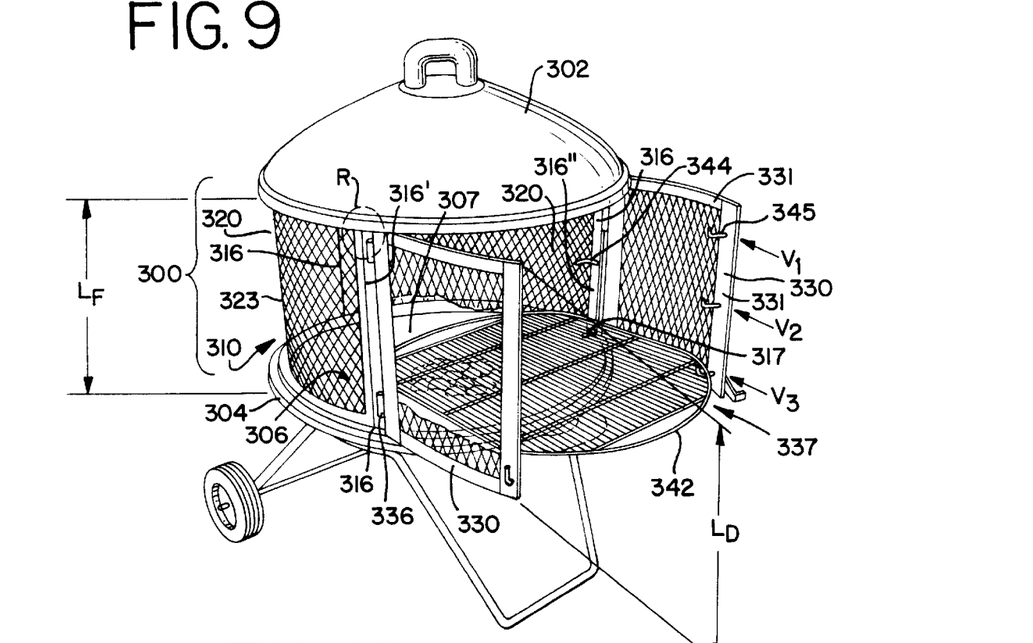
FIG. 9 is a perspective view of another embodiment of a portable outdoor fireplace constructed in accordance with the principles of the present invention.

FIG. 9 illustrates another fireplace 300 constructed in accordance with the principles of the present invention. This fireplace 300 is similar in general construction to the embodiments of FIGS. 2–8 and is seen to include opposing top and bottom portions 302, 304 which respectively serve as a cover and fire bowl for the fireplace. The bottom portion 304 has a depression, or recess 306 formed therein which serves as a combustion or fire chamber 307 for an appropriate fuel, such as wood, charcoal or the like.

A fire screen assembly 310 is interposed between the top and bottom portions 302, 304 and is similar in construction to the fire screen assembly of FIG. 4 in that it includes a frame 312 formed from top and bottom frame members 314, 315, shown as support rings. The top and bottom frame portions 314, 315 are interconnected by vertical riser portions 316 with three such risers being shown.

Each of the risers 316 includes a support tab 317 that extends outwardly therefrom at an angle thereto to engage the interior surface of the cover portion 302 and provide a reliable support for the fireplace top portion 302. The support tabs 317 are the primary source of contact between the fire screen assembly 310 and the top portion 302 rather than the top frame portion 314 and therefore reduce the amount of heat transferred between the fire screen assembly 310 and the top portion 302 because of the reduction in contact area. The bottom support ring 315 engages a series of upwardly extending tabs, or clips 328, disposed with the recess of the bottom portion 304 that engage the interior of the bottom support ring 315 in order to hold the fire screen assembly 310 upright. The fire screen assembly 310 preferably has a diameter $D_1$ that is less than the diameter $D_2$ of the bottom cover portion 304 to provide an annular offset between the fire screen assembly 310 and the outer edges of the top and bottom cover portions 302, 304.

A plurality of fire screen panels 320 are applied to the fire screen assembly 310 along the exterior thereof to effectively screen the fire chamber 307 to prevent the escape of burning embers and the like therefrom. Each screen panel 320 is preformed in a curve which substantially matches the outer curved extent of the frame portions 314, 315. The screen panels 320 include endpieces 332 that are welded together to define the perimeter of the panels 320 and a rectangular or square extent of screening 323 that is attached to the endpieces 322 in a permanent fashion, such as by tack or spot welding 325 near the edges 324 of the screening 323 as generally shown in FIG. 16.

Figures 14, 15, 16:
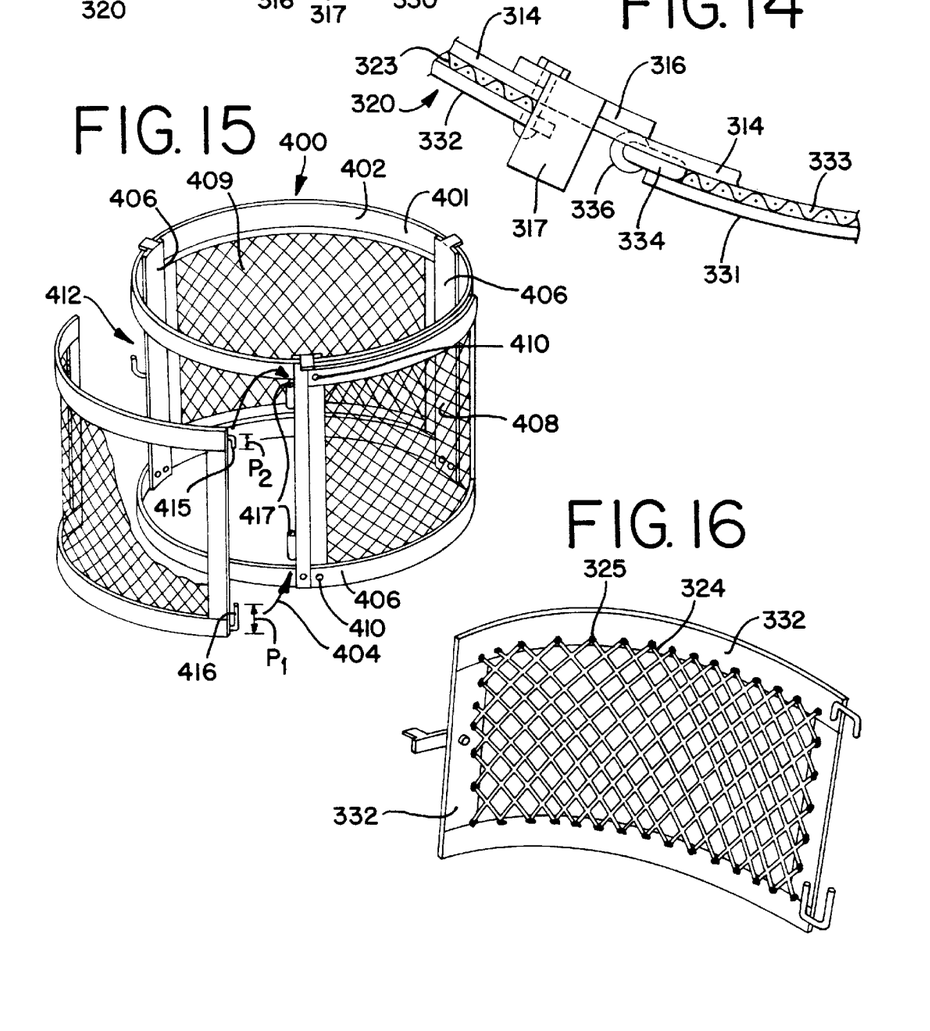
FIG. 14 is an enlarged, detailed end view of the fire screen assembly of the fireplace of FIG. 9, taken at the area indicated by the arrow R, with the top portion removed for clarity.
FIG. 15 is a perspective view of another fire screen assembly suitable for use with fireplaces of the present invention and having a single door mounted on its entrance.
FIG. 16 is a perspective view of the door of the fire screen assembly of FIG. 15.

The precurved screen panels 320 are attached to the fire screen assembly 310, preferably by a series of bolts 326 that extend through the perimeter ends 322, the frame portions 314, 315 and the risers 316 as illustrated best in FIG. 14. The use of these preformed screen panels 320 greatly reduces the cost of manufacturing and also assembly as compared to the fireplace of FIG. 1 because of the elimination of the double frame rings and curved slots 24. The screen extents 323 may have a diagonal pattern as shown in FIGS. 9 & 10, or as shown in FIG. 11, the screen extents 329 may have a square or rectangular grid-like pattern.

In an important aspect of the present invention, the fireplace 300 has one or more screen doors 330 mounted thereto in a manner which permits the door 330 to be opened and closed so that a user may gain direct access to the combustion chamber inside the fire screen assembly 310 from the side rather than by removing the top cover portion 302 to reduce the likelihood of occurrence of burns to a user of the fireplace 300.

Figure 10:
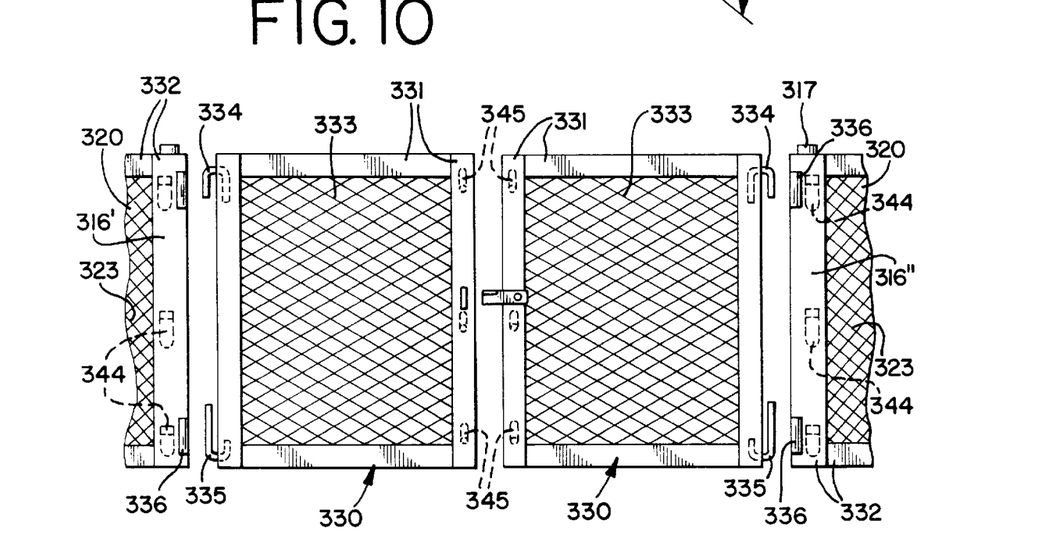
FIG. 10 is a flat projection view of the fire screen assembly of the fireplace of FIG. 9, showing the fire screen door portions thereof.
Figure 11:
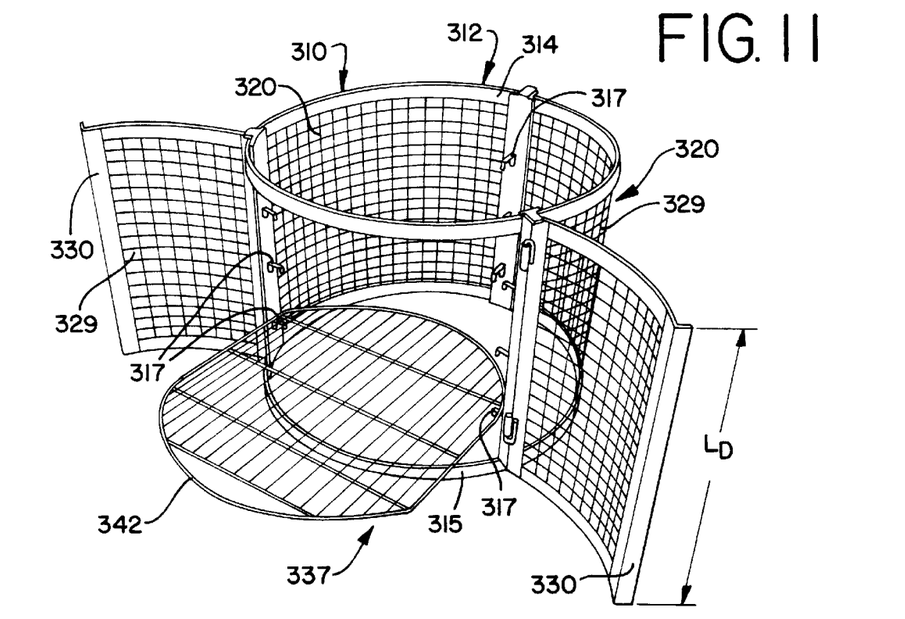
FIG. 11 is a perspective view of a fire screen assembly suitable for use in converting an existing kettle-shaped barbecue grill into a portable outdoor fireplace in accordance with the principles of the present invention.

As shown best in FIG. 10, the screen doors 330 also include sets of endpieces 331 joined together, such as by welding, to define the extent and area of each door 330. An extent of metal screening 333 is joined to these endpieces 332, also preferably by welding. The doors 330 each include at their leftmost and rightmost edges, top and bottom hinge pins 334, 335 that are shown welded to the door endpieces 332. These hingepins 334, 335 are received in corresponding associated hingeposts 336 formed on the two risers 316', 316" that serve to define an entrance 337 of the fireplace 300 to the interior thereof. The screen doors 330 also contain a suitable means for engaging each other, shown in FIG. as a latch 338 on door 330' and a hook 339 formed on the other door 30 330".

In order to facilitate the installation of the screen doors 330 onto the fire screen assembly 310, the two hingepins 334, 335 are of different lengths $P_1$ & $P_2$, with the lower hinge pin 335 has a larger length $P_1$ than the length of the top hinge pin 334. As such, during installation, the lower hinge pin 335 is inserted into its corresponding hinge post 336 and the associated screen door is raised enough to permit entry of the top hinge pin 334 into the top hinge post 336. The screen doors 330 also preferably have a height $L_D$ that is less than the total height $L_F$ of the fire screen assembly 310 and between the top and bottom portions 302, 304 of the fireplace so that, as illustrated in FIG. 9, the screen doors 330 may open and close without interference from either or both of the top and bottom portions 302, 304.

Figure 13:
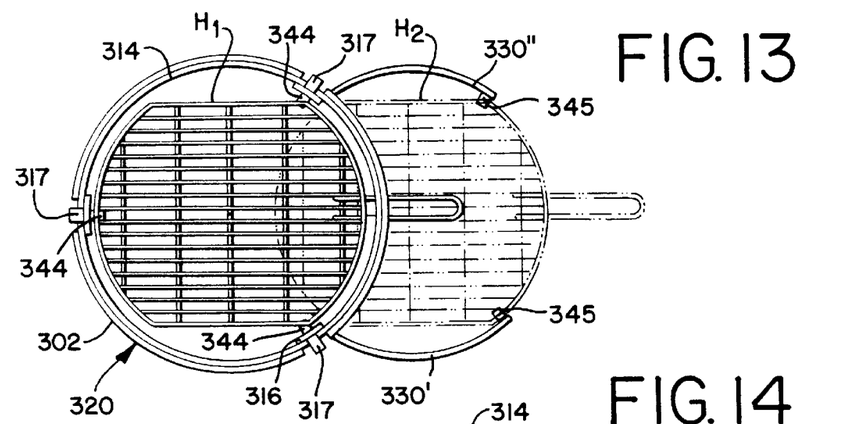
FIG. 13 is a top plan view of the fire screen assembly of FIG. 9 with a cooking grill in place illustrating the two horizontal placements of the grill in the fireplace.

The risers 316 may include a means for supporting a cooking grill 342, such as a series of supports, in the form of tabs 344 that extend inwardly therefrom in a manner so as to reliably support the grill 342 within the fireplace interior. The grill 342, as shown in FIG. 13, preferably has an outer perimeter that approximates the inner diameter of the fire screen assembly 310. The grill 342 may be supported in three different vertical positions $V_1$, $V_2$, $V_3$ within the fireplace 300 by the different sets of support tabs 344. As illustrated in FIGS. 9 & 13, the fireplace doors 330 may include another set of support tabs, or hooks 345, along their edges 331. These tabs 345 cooperate with the interior tabs 344 to define additional grill positions for the fireplace.

As shown in FIG. 13, in the first position $H_1$, the cooking grill 342 is supported virtually entirely within the fireplace 300 by the support tabs 344 and in the second position $H_2$ (shown in phantom in FIG. 13), the cooking grill 342 is supported partially within the fireplace 300 and outside of the fireplace between the two adjoining doors 330', 330". In this second position, the grill 342 is supported by the support tabs 344 positioned near the entrance 337 and the support tabs 345 positioned on the interior of the fireplace 30 doors 330', 330". Therefore, it will be understood that fireplaces of the present invention permit a user to have multiple, different grill positions $V_{1-3}$ & $H_{1-2}$ at different horizontal and vertical placements.

Fireplaces of the present invention may also include only one screen door as illustrated in FIG. 15. In such an instance, the fire screen assembly 400 has a frame 401 having two opposing top and bottom support rings 402, 404 interconnected by vertical columns 406. Two fire screen panels 408, 409 are attached to the exterior of the frame 401 by way of bolts 410 to cover the spaces defined between two adjacent support columns, leaving an opening between two of the columns which forms an entrance 412 to the interior of fire screen assembly 400. A third curved screen panel 413 having a curve that approximates the perimeter of the support rings 402, 404 is provided with hinge pins 415, 416 (of different lengths $P_1$, $P_2$ as explained above) that are received within associated hinge posts 417 from opposing top and bottom directions. The screen panel 413 therefore serves as a single access door that spans the entrance 412 of the fire screen assembly 400. Cooking grill support members may be formed on the columns 406 as explained above in order to support a cooking grill.

Figure 12:
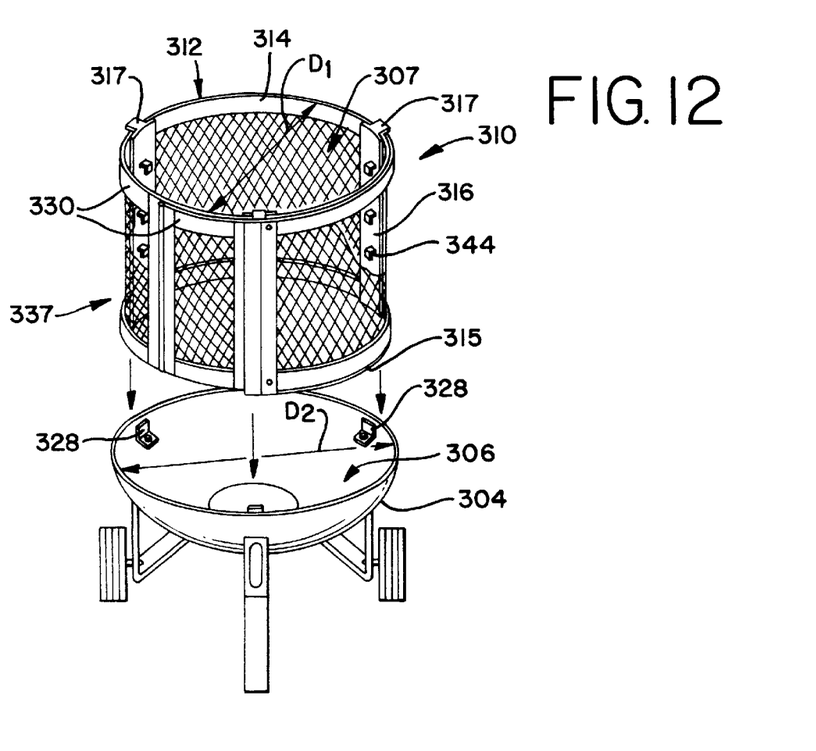
FIG. 12 is a perspective view showing how the fire screen assembly of FIG. 11 fits into the fire bowl of a barbecue grill.

It can be seen that the principles of the present invention may also be applied to a fire screen assembly by itself which may be used to modify an existing barbecue grill into a portable outdoor fireplace having the benefits of the present invention. Such fire screen assemblies are shown in FIGS. 11, 12 and 15. These fire screen assemblies 310 may be made and sold as a kit for modifying an existing conventional "kettle-style" barbecue grill having opposing, interengaging top and bottom cover members into a portable fireplace with the benefits and advantages described previously above.

In such instances, the fire screen assembly 310 is assembled and placed in the bottom cover member of the grill and supported therein by clips 328 which may be separately applied to the bottom cover member. The top member of the barbecue grill is then placed upon the top of the fire screen assembly 310 in contact with the support tabs 317 to provide a top cover for the fire screen assembly 310. Access than may be had to the interior of the fireplace, and its burning chamber 307 by way of the access door or doors 330.

While the preferred embodiments of the invention have been shown and described, it will be apparent to those skilled in the art that changes and modifications may be made therein without departing from the spirit of the invention, the scope of which is defined by the appended claims.

I Claim:

1. A portable fireplace, comprising:
a base member for supporting and burning the combustible material therein, a fire screen assembly supported by the base member, the fire screen assembly defining a generally cylindrical burning chamber containing said combustible material within said base member, a cover member supported by said fire screen assembly and providing a cover for the burning chamber, said fire screen assembly including first and second fire screen panels which provide a protective screen around said combustible material, said fire screen assembly further including a frame including a pair of opposing ring members interconnected by vertical columns which cooperate together with said first and second fire screen panels to define the enclosure, the frame ring members defining a circular perimeter of said enclosure, two of said frame columns being spaced apart from each other along said enclosure perimeter, said two frame columns defining an entrance of said enclosure, and said entrance including means for holding a cooking grill insertable horizontally into said frame, and supporting the cooking grill in said frame in a horizontal orientation with respect to said base member, said cooking grill support means including pairs of corresponding support members disposed on said entrance frame columns.

2. The portable fireplace as defined in claim 1, wherein said support members include pairs of corresponding slots formed in said two entrance frame columns.

3. The portable fireplace as defined in claim 1, wherein said support members include pairs of corresponding support members disposed on said entrance frame columns and extending outwardly therefrom.

4. The portable fireplace as defined in claim 1, wherein said fire screen assembly includes at least one access door hingedly mounted thereto near said enclosure entrance, the access door being openable and closeable at said enclosure entrance from a side of said fireplace to permit access to the interior of said enclosure,.

5. The portable fireplace as defined in claim 4, wherein said access door includes a curved screen panel.

6. The portable fireplace as defined in claim 4, wherein said fire screen assembly has a first height that seperates said base and cover members vertically apart by first spacing and said access door has second height less than said fire screen assembly first height and first spacing such that said access door may be opened and closed without interference with said base and cover members.

7. The portable fireplace as defined in claim 1, wherein said fire screen assembly includes a pair of access doors covering said enclosure entrance, the access doors opening outwardly with respect to said enclosure.

8. The portable fireplace as defined in claim 7, wherein said cooking grill support means further includes at least one pair of additional support members disposed on said access doors for supporting said cooking grill between said access doors in a horizontal orientation with respect to said base member.

9. The portable fireplace as defined in claim 8, wherein said access doors include pairs of corresponding additional support member for supporting said cooking grill between said access doors at different elevations with respect to said base member.

10. The portable fireplace as defined in claim 7, wherein each of said access doors is curved and includes a curved screen panel.

11. The portable fireplace as defined in claim 1, further including a wheeled undercarriage attached to said base member.

12. The portable fireplace as defined in claim 1, wherein said support members are disposed on said entrance frame columns at different elevations to define different vertical orientations of said cooking grill with respect to said base member.

13. A portable fireplace, comprising: a base member for supporting and burning combustible material therein, the base member having a circular outer edge of a first diameter, a cover member having a circular outer edge of said first diameter, a fire screen assembly supported by the base member and supporting the cover member in a vertical orientation from said base member, the fire screen assembly spacing said base and cover members apart in a predetermined distance, said fire screen assembly including a frame assembly and a plurality of screen panels associated therewith that cooperatively define a generally cylindrical screened enclosure having a second diameter that is less than said base and cover member first diameter, the screened enclosure having a circular outer perimeter, said frame assembly further including a pair of spaced-apart vertical columns disposed along said screened enclosure perimeter, said two vertical columns defining an entrance of said screened enclosure by which access can be had to an interior portion of said screened enclosure, said fire screen assembly further including at least one access door spanning said screened enclosure entrance, the access door being hingedly mounted to said fire screen assembly thereat and having a height less than said predetermined distance separating said base and cover members such that said access door may be opened from a side of said fireplace without interfering with either of said base and cover members.

14. The portable fireplace as defined in claim 13, wherein said fire screen assembly includes two access doors mounted on opposite sides of said enclosure entrance.

15. The portable fireplace as defined in claim 14, wherein said said two access doors include two screen panels that respectively span approximately one-half of said screened enclosure entrance.

16. The portable fireplace as defined in claim 13, wherein said access door includes a four-sided frame, a screen panel disposed on said frame and a pair of hinge pins mounted on one side of said frame, and one of said two vertical columns including a pair of hinge posts that receive said access door hinge pins therein from opposite directions.

17. The portable fireplace as defined in claim 13, wherein said screened enclosure entrance includes a plurality of pairs of supports for supporting a cooking grill insertable into said frame in a horizontal orientation with respect to said base member, the pairs of supports being disposed on said two vertical columns on opposite sides of said entrance to said screened enclosure.

18. A portable fireplace, comprising:
- a base member for supporting and burning combustible material therein;
- a fire screen assembly supported by the base member, the fire screen assembly defining a screened enclosure on said base member enclosing the combustible material within said base member, said fire screen assembly including a frame having opposing top and bottom frame members interconnected by vertical columns, the frame supporting at least a pair of fire screen panels in an vertical orientation with respect to said base member, two of said frame columns defining an entrance of said enclosure;
- at least one screened access door extending between the two frame columns and overlying the screened enclosure entrance, the access door being mounted to said fire screen assembly so that it is openable and closeable from a side of said fireplace without interference with said base member; and,
- a plurality of cooking grill support members disposed along said two columns at said entrance for holding a cooking grill insertable into said frame and supporting said cooking grill in different horizontal orientations with respect to said base member.

19. A fire screen assembly for converting an outdoor barbecue grill having opposing interengaging, top and bottom members, the fire screen assembly defining a generally cylindrical enclosure for containing combustible material within the barbecue grill bottom member, said fire screen assembly comprising:
- a frame assembly including respective top and bottom portions for respectively engaging said barbecue grill top and bottom members, a plurality of fire screens supported on the frame assembly and extending partially therearound said said frame assembly further including a pair of vertical columns cooperatively defining an entrance of said cylindrical enclosure, said fire screen assembly further including at least one screen door hingedly supported by one of said frame assembly entrance columns between said barbecue grill top and bottom members through which access to said cylindrical enclosure may be had, said screen door panel having a height that is less than the height of said screen assembly so that said screen door may be opened to gain access to said cylindrical enclosure without interfering with either of said grill top and bottom members.

20. The fire screen assembly of claim 19, further including a cooking grill, and means of for supporting the cooking grill in said frame assembly in a horizontal orientation with respect to said barbecue grill bottom member, the cooking grill support means including pairs of corresponding support members disposed along said frame assembly entrance columns.

21. The fire screen assembly of claim 19, further including an additional screen door panel hingedly supported by the other of said frame assembly entrance columns, and said frame assembly entrance columns include at least one pair of support members disposed on said frame assembly entrance columns that are adapted to support opposite sides of a cooking grill on said frame assembly above said barbecue grill bottom member.

* * * * *